(12) United States Patent
Anderson et al.

(10) Patent No.: US 10,583,756 B2
(45) Date of Patent: Mar. 10, 2020

(54) CHILD RESTRAINT FOR VEHICLE

(71) Applicant: Dorel Juvenile Group, Inc., Foxboro, MA (US)

(72) Inventors: Robert S. Anderson, Narvon, PA (US); David A. Lehman, Lancaster, PA (US); Mei-Hui Lin, Nashville, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 77 days.

(21) Appl. No.: 15/796,160

(22) Filed: Oct. 27, 2017

(65) Prior Publication Data

US 2018/0118058 A1  May 3, 2018

Related U.S. Application Data

(60) Provisional application No. 62/414,244, filed on Oct. 28, 2016.

(51) Int. Cl.
*B60N 2/28* (2006.01)

(52) U.S. Cl.
CPC ........... *B60N 2/2806* (2013.01); *B60N 2/286* (2013.01); *B60N 2/2821* (2013.01)

(58) Field of Classification Search
None
See application file for complete search history.

(56) References Cited

U.S. PATENT DOCUMENTS

| | | | |
|---|---|---|---|
| 3,794,379 A * | 2/1974 | Furey | B60N 2/2806 297/256.13 |
| 4,186,962 A * | 2/1980 | Meeker | B60N 2/2839 297/256.13 |
| 5,106,154 A * | 4/1992 | Kain | B60N 2/286 297/130 |
| 5,609,393 A * | 3/1997 | Meeker | B60N 2/2821 297/216.19 |
| 6,000,753 A | 12/1999 | Cone, II | |
| 6,299,249 B1 * | 10/2001 | Mori | B60N 2/2821 297/250.1 |
| 6,540,293 B1 * | 4/2003 | Quackenbush | B60N 2/2806 297/250.1 |
| 7,464,990 B2 | 12/2008 | Collias | |
| 7,887,129 B2 * | 2/2011 | Hei | B60N 2/2806 297/256.16 |
| 8,317,265 B2 | 11/2012 | Hutchinson et al. | |
| D730,651 S | 6/2015 | Perego | |
| 2015/0091348 A1 | 4/2015 | Juchniewicz et al. | |

* cited by examiner

*Primary Examiner* — Kristina N Junge
(74) *Attorney, Agent, or Firm* — Barnes & Thornburg LLP

(57) ABSTRACT

A child restraint includes a juvenile seat and a seat-support base having a seat bottom and a seat back. The seat-support base is adapted to be anchored on a passenger seat of a vehicle.

11 Claims, 7 Drawing Sheets

CHILD RESTRAINT FOR VEHICLE

PRIORITY CLAIM

This application claims priority under 35 U.S.C. § 119(e) to U.S. Provisional Application No. 62/414,244, filed Oct. 28, 2016, which is expressly incorporated by reference herein.

BACKGROUND

The present disclosure relates to child restraints, and particularly to child restraints for use on passenger seats in vehicles. More particularly, the present disclosure relates to a base that is adapted to engage a seat bottom and a seat back of a vehicle passenger seat and that is inclined in a child restraint.

SUMMARY

A child restraint in accordance with the present disclosure includes a juvenile holder configured to hold a young child or infant. In illustrative embodiments, the juvenile holder includes a seat-support base adapted to set on a passenger seat in a vehicle and a juvenile seat configured to be mounted on the seat-support base after the seat-support base is anchored to the vehicle passenger seat using a vehicle seat belt associated with the passenger seat.

In illustrative embodiments, the seat-support base can remain in the anchored stationary position on the vehicle passenger seat and a caregiver can mount a juvenile seat on the seat-support base when it is desired to transport a young child or infant in the vehicle. In accordance with the present disclosure, the juvenile seat can be an infant carrier or a seat sized to carry an older child.

In illustrative embodiments, the seat-support base includes a foundation that is adapted to set on the vehicle passenger seat and a seat-holder unit. The seat-holder unit is coupled to the foundation and configured to provide means for holding the juvenile seat in a stationary position and orientation relative to the foundation while the foundation is retained in an anchored position on a companion vehicle passenger seat.

In illustrative embodiments, the foundation has a rearwardly facing rear wall comprising two separate upper and lower seat-back engagement pads that are arranged relative to one another so that only one of the engagement pads is adapted to engage a seat back of the vehicle passenger seat when the seat-support base is anchored to the vehicle passenger seat. The foundation also has a downwardly facing bottom wall adapted to engage on seat bottom of the vehicle passenger seat when the seat-support base is anchored to the vehicle passenger seat. The upper seat-back engagement pad engages the seat back of a vehicle passenger seat having a relatively steep-inclined seat bottom. Alternatively, the lower seat-back engagement pad engages the seat back of a vehicle passenger seat having a relatively shallow-inclined seat bottom. The rear and bottom walls of the foundation are configured to mate with a wide variety of vehicle passenger seats in which there is substantial variance in the open included angle defined between the seat bottom and seat back of the vehicle passenger seat and a variance in the steepness of the incline of the seat bottom of the vehicle passenger seat.

In illustrative embodiments, the foundation further includes two laterally spaced apart side walls and each side wall is formed to include an upwardly facing belt-receiving notch. A foundation-anchor belt coupled to the vehicle passenger seat is arranged to extend laterally across the foundation along a path below the juvenile seat that is mounted on the seat-holder unit that is coupled to the foundation. The foundation-anchor belt passes through the belt-receiving notch formed in each foundation side wall. In accordance with the present disclosure, the foundation-anchor belt engages an upwardly facing lateral edge provided in each side wall and associated with each belt-receiving notch to create a fulcrum on the first and second side walls of the foundation. In illustrative embodiments, such a fulcrum is established on the upwardly facing lateral edges of the foundation side walls to lie at a distance of at least eight inches from a seat bite formed at a junction between the seat bottom and back of the vehicle passenger seat so that a vehicle seatbelt buckle included in the foundation-anchor belt and arranged to lie outside of a space provided between the first and second foundation side walls will not be forced over the fulcrum in such a way as to limit the tightening function of the foundation-anchor belt.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed disclosure particularly refers to the accompanying figures in which.

DETAILED DESCRIPTION

Figure 1:
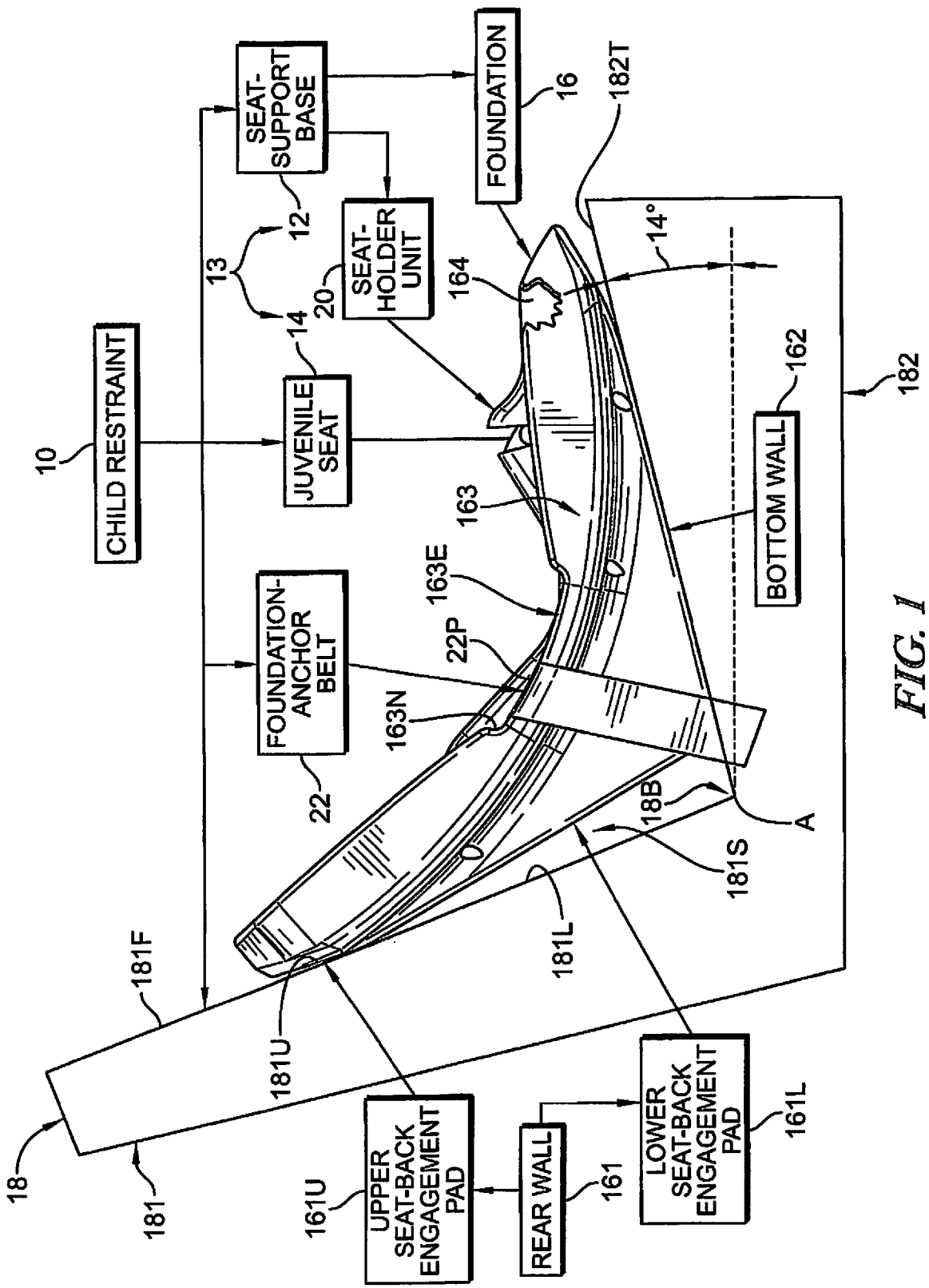
FIG. 1 is a side elevation view of a child restraint including an illustrative seat-support base in accordance with the present disclosure and a diagrammatic juvenile seat coupled to the seat-holder unit of the seat-support base and showing that the seat-support base also includes a foundation that provides a footing for the seat-holder unit and is anchored by a foundation-anchor belt to lie in a stationary position on an illustrative first vehicle passenger seat having a steeply inclined seat bottom and suggesting that the foundation includes a bottom wall engaging the steeply inclined seat bottom of the vehicle passenger seat and a rear wall including an unused lower seat-back engagement pad and a rearwardly facing upper seat-back engagement pad that is used to engage an upper section of a seat back in the vehicle passenger seat when the foundation is anchored to the vehicle passenger seat.

A child restraint 10 in accordance with the present disclosure includes a seat-support base 12 and a juvenile seat 14 as suggested in FIG. 1. Seat-support base 12 includes a foundation 16 that is adapted to set on a vehicle passenger seat 18 and a seat-holder unit 20 that is coupled to foundation 16 and configured to mate with juvenile seat 14 to support juvenile seat 14 in a selected stationary position relative to foundation 16. Foundation 16 is sized and shaped to mate with a wide variety of differently shaped first vehicle passenger seats 18 or 118 having steep-inclined seat bottoms 182 or 1182 as suggested in FIGS. 1 and 4 and a second vehicle passenger seat 218 having a shallow-inclined seat bottom 2182 as suggested in FIG. 5.

Child restraint 10 also includes a foundation-anchor belt 22 that is coupled to vehicle passenger seat 18. In illustrative embodiments, foundation-anchor belt 22 is a lap belt included in a passenger-restraint system associated with vehicle passenger seat 18 and configured normally to restrain the upper legs of an adult seated on vehicle passenger seat 18.

Figure 6:
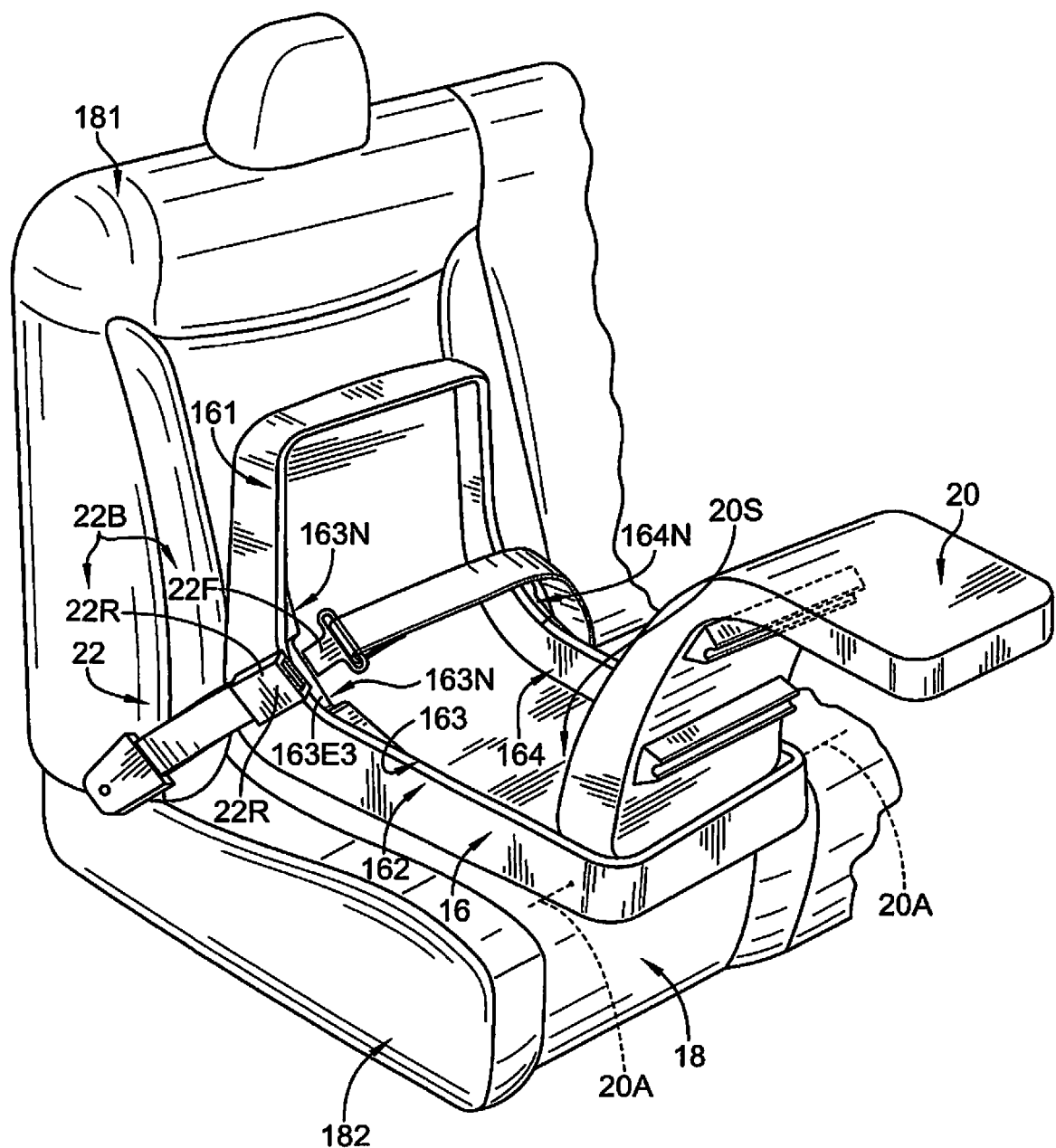
FIG. 6 is a diagrammatic perspective view of the seat-support base of FIGS. 1-3 at rest on a vehicle passenger seat and suggesting that a fitting on a free end of a far belt strap can be inserted into a buckle on a free end of a near belt strap to provide a foundation-anchor belt that can be used to anchor the foundation of the seat-support base to the vehicle passenger seat.

Foundation 16 of seat-support base 12 is somewhat L-shaped as suggested in FIG. 1 and includes a rear wall 161, a bottom wall 162, a first side wall 163, and an opposite second side wall 164 that is arranged to lie in laterally spaced-apart parallel relation to first side wall 163 to provide a space 20S therebetween for receiving seat-holder unit 20 as suggested in FIG. 6. First side wall 163 is formed to include a relatively wide upwardly opening belt-receiving notch 163N that is sized and located to receive a portion of foundation-anchor belt 22 as suggested in FIG. 1 to retain seat-support base 12 in an anchored stationary position an vehicle passenger seat 18. Second side wall 164 is formed to include a similar belt-receiving notch 164N as suggested in FIG. 6.

Seat-support base 12 can remain in an anchored stationary position on passenger seat 18 and a caregiver can mount juvenile seat 14 on seat-holder unit 20 of seat-support base 12 when it is desired to transport a young child or infant in the vehicle as suggested diagrammatically in FIG. 1. In accordance with the present disclosure, juvenile seat 14 can be an infant carrier or a seat sized to carry an older child.

Vehicle passenger seat 18 includes a seat back 181 and a seat bottom 182 as shown in FIG. 1. Vehicle passenger seat 18 is formed to include a seat bite 18B at the junction between seat back 181 and seat bottom 182 as suggested in FIG. 1. Seat back 181 includes a forwardly facing front surface 181F as shown, for example, in FIG. 1. Seat bottom 182 includes an upwardly facing top surface 182T.

As suggested in FIG. 1, foundation 16 of seat-support base 12 is anchored by foundation-anchor belt 22 to lie in a stationary position on an illustrative first vehicle passenger seat 18. Bottom wall 162 of foundation 16 engages top surface 182T of seat bottom 182 of vehicle passenger seat 18.

Rear wall 161 of foundation 16 includes rearwardly facing upper and lower seat-back engagement pads 161U, 161L as shown in FIG. 1. Lower seat-back engagement pad 161L is arranged to extend between and interconnect a lower edge of upper seat-back engagement pad 161U and a rear edge of bottom wall 162 as suggested in FIG. 1. In an illustrative embodiment shown in FIG. 3 a first reference plane P1 associated and aligned with upper seat-back engagement pad 161U and a second reference plane P2 associated and aligned with lower seat-back engagement pad 161L cooperate to form an acute angle α that has a measure of about 20°.

Figure 4:
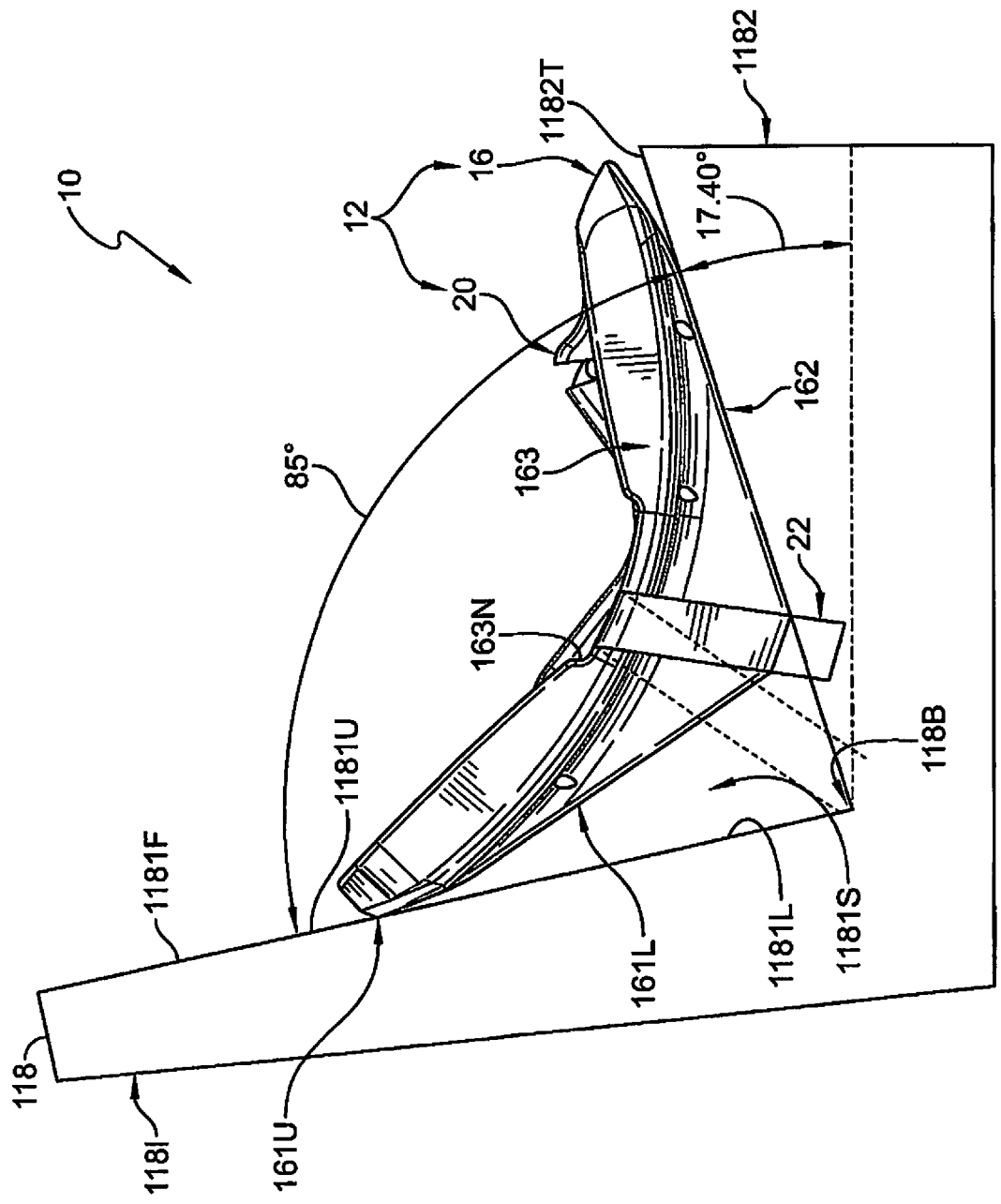
FIG. 4 is a reduced side-elevation view showing the orientation of the foundation of the seat-support base of FIGS. 1-3 relative to an illustrative first vehicle passenger seat having a steep-inclined seat bottom and a seat back that cooperate to form an open included angle having a measure of about 85° in which the steep-inclined seat bottom is inclined at about 17.4° from the horizontal so as to be inclined a bit more steeply than the seat bottom shown in FIG. 1 and suggesting that, in such a seat configuration, an upper portion of the upper seat-back engagement pad of the rear wall of the foundation engages the seat back of the vehicle passenger seat and the bottom wall of the foundation engages the seat bottom of the vehicle passenger seat.

Upper seat-back engagement pad 161U of rear wall 161 of foundation 16 engages an upper section of seat back 181 of a vehicle passenger seat 18 having a steep-inclined seat bottom 182 as shown in FIG. 1. In the case of a vehicle passenger seat 118 having a more steeply inclined seat bottom 1182 as shown in FIG. 4, an upper portion of upper seat-back engagement pad 161U of rear wall 161 of foundation 16 engages the upper section of seat back 1181. In each of these instances, the lower seat-back engagement pad 161L is arranged to lie in spaced-apart relation to a lower section of seat back 181, 1181 to define lower separation spaces 181S, 1181S therebetween as suggested in FIGS. 1 and 4. As suggested in FIGS. 1 and 4, the volume of lower separation space 1181S is greater than the volume of lower separation space 181S.

Figure 5:
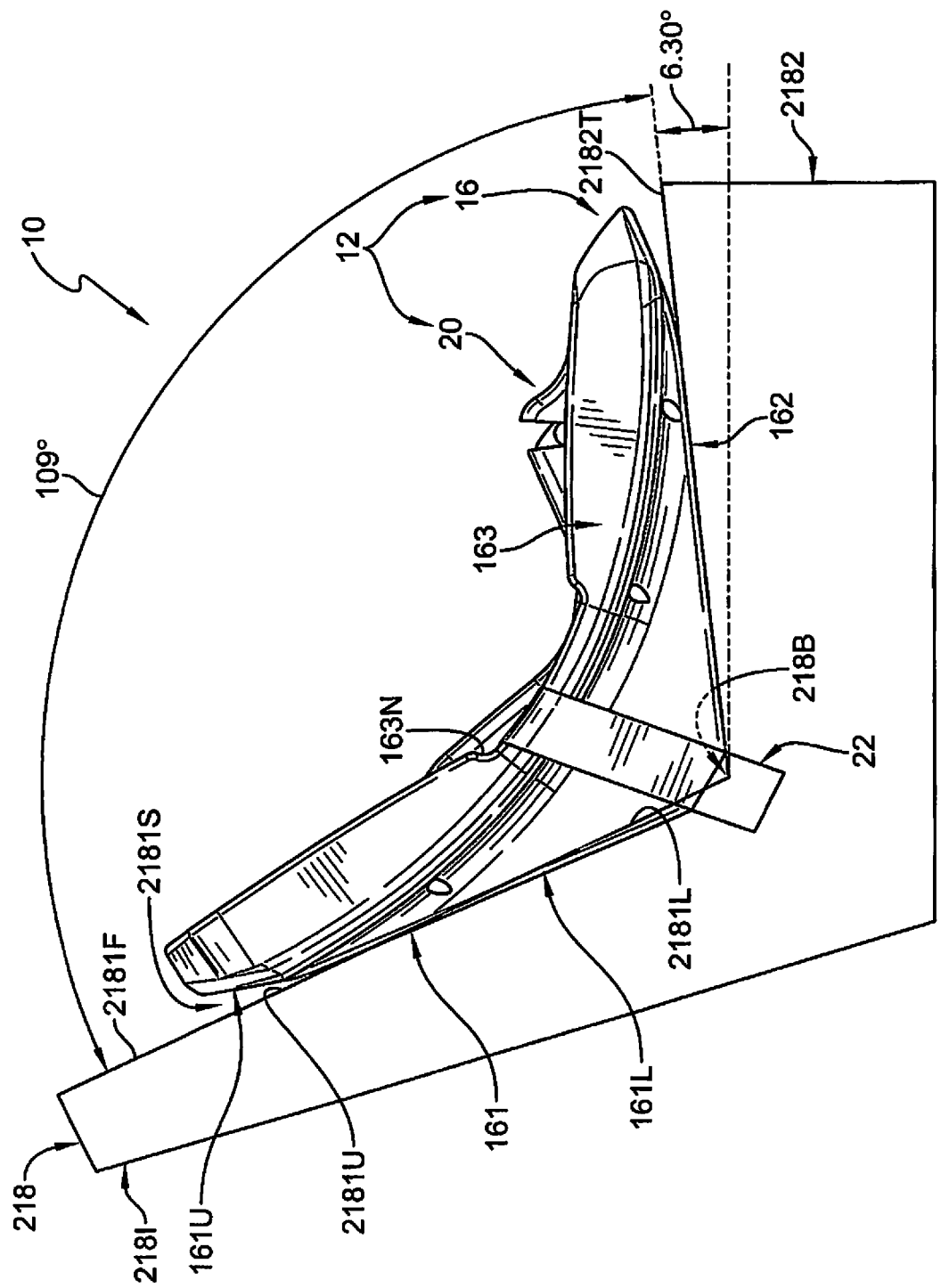
FIG. 5 is a view of the seat-support base of FIG. 4 on an illustrative second vehicle passenger seat having a shallow-inclined seat bottom characterized by a relatively less steep inclined top surface and showing the orientation of the foundation of the seat-support base of FIGS. 1-3 and showing that the shallow-inclined seat bottom and a seat back cooperate to form an open included angle having a measure of about 109° in which the shallow-inclined seat bottom is inclined at about 6.3° from the horizontal and suggesting that, in such a seat configuration, the lower seat-engagement pad of the rear wall of the foundation engages the seat back of the vehicle passenger seat and the bottom wall of the foundation engages the seat bottom of the vehicle passenger seat.

Lower seat-back engagement pad 161L of rear wall 161 of foundation 16 engages a lower section of seat back 2181 of a vehicle passenger seat 218 having a shallow-inclined seat bottom 2182 as shown in FIG. 5. Upper seat-back engagement pad 161U is arranged to lie in spaced-apart relation to an upper section of seat back 2182 to define an upper separation space 2181S therebetween as suggested in FIG. 5.

A portion 22P of foundation-anchor belt 22 is positioned to lie in belt-receiving notch 163N formed in first side wall 163 of foundation 16 and engage an upwardly facing edge 163E of first side wall 163 that provides a boundary for belt-receiving notch 163N as suggested in FIGS. 1 and 6.

Figure 3:
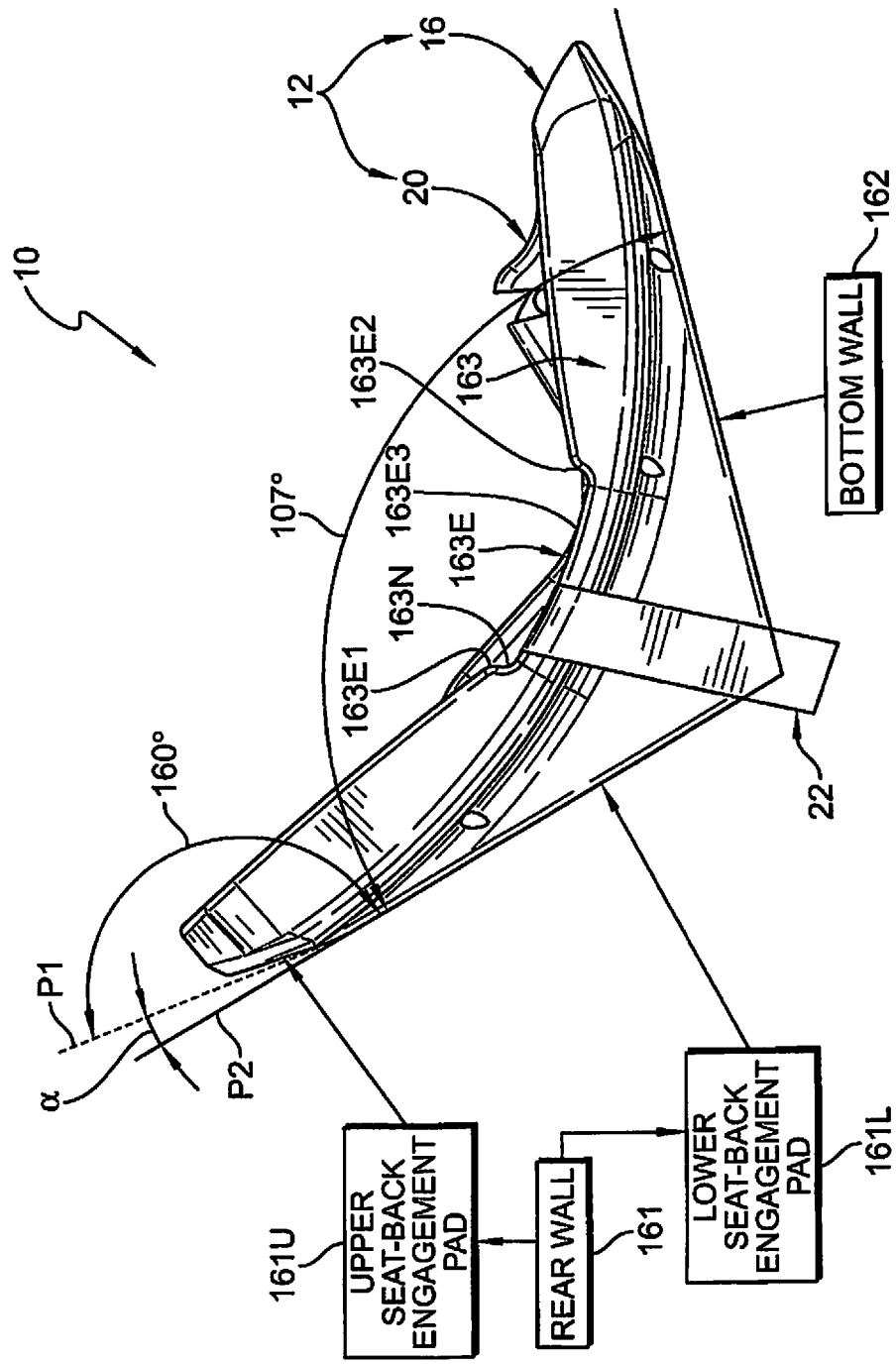
FIG. 3 is an enlarged side-elevation view of the seat-support base of FIGS. 1 and 2 showing that the foundation includes a bottom wall and a rear wall comprising the rearwardly facing upper seat-back engagement pad and a separate rearwardly facing lower seat-engagement pad below the rearwardly facing upper seat-back engagement pad and showing that an open included angle between the upper and lower seat-back engagement pads has a measure of about 160° and that an open included angle defined between the bottom wall and the lower seat-back engagement pad of the rear wall has a measure of about 107°.

Edge 163E is generally U-shaped as shown in FIG. 1 and includes relatively short and spaced apart first and second upright sections 163E1, 163E2 and a relatively longer lateral section 163E3 extending between and interconnecting lowermost ends of the first and second upright sections 163E1, 163E2 as suggested in FIG. 3. As compared to lateral section 163E3, first upright section 163E1 has a relatively negative slope and second upright section 163E2 has a relatively positive slope. Belt-receiving notch 164N formed in second side wall 164 of foundation 16 is similar in shape and function to belt-receiving notch 163N.

A "to-scale" illustration of seat-support base 12 is provided in FIGS. 1-5. Dimensions (mm) of 320 and 280 for rear wall 161 and bottom wall 162 as measured from point A are provided in FIG. 1. These dimensions 320, 380 provide shape definition for a first feature of foundation 16. Contact points for upper seat-back engagement pad 161U of rear wall 161 of foundation 16 on companion forwardly facing front surface 181F of seat back 181 range from 320 mm to 380 mm from seat bite 18B upwardly along forwardly facing front surface 181F of seat back 181 of vehicle passenger seat 18 as shown in FIG. 1. In illustrative embodiments, no portion of rear wall 161 of foundation 16 other than upper seat-back engagement pad 161U engages forwardly facing front surface 181F of seat back 181 when foundation 16 of seat-support base 12 is anchored in a stationary position on a vehicle passenger seat 18 having a steep-inclined seat bottom 182 as shown, for example, in FIG. 2.

Figure 2:
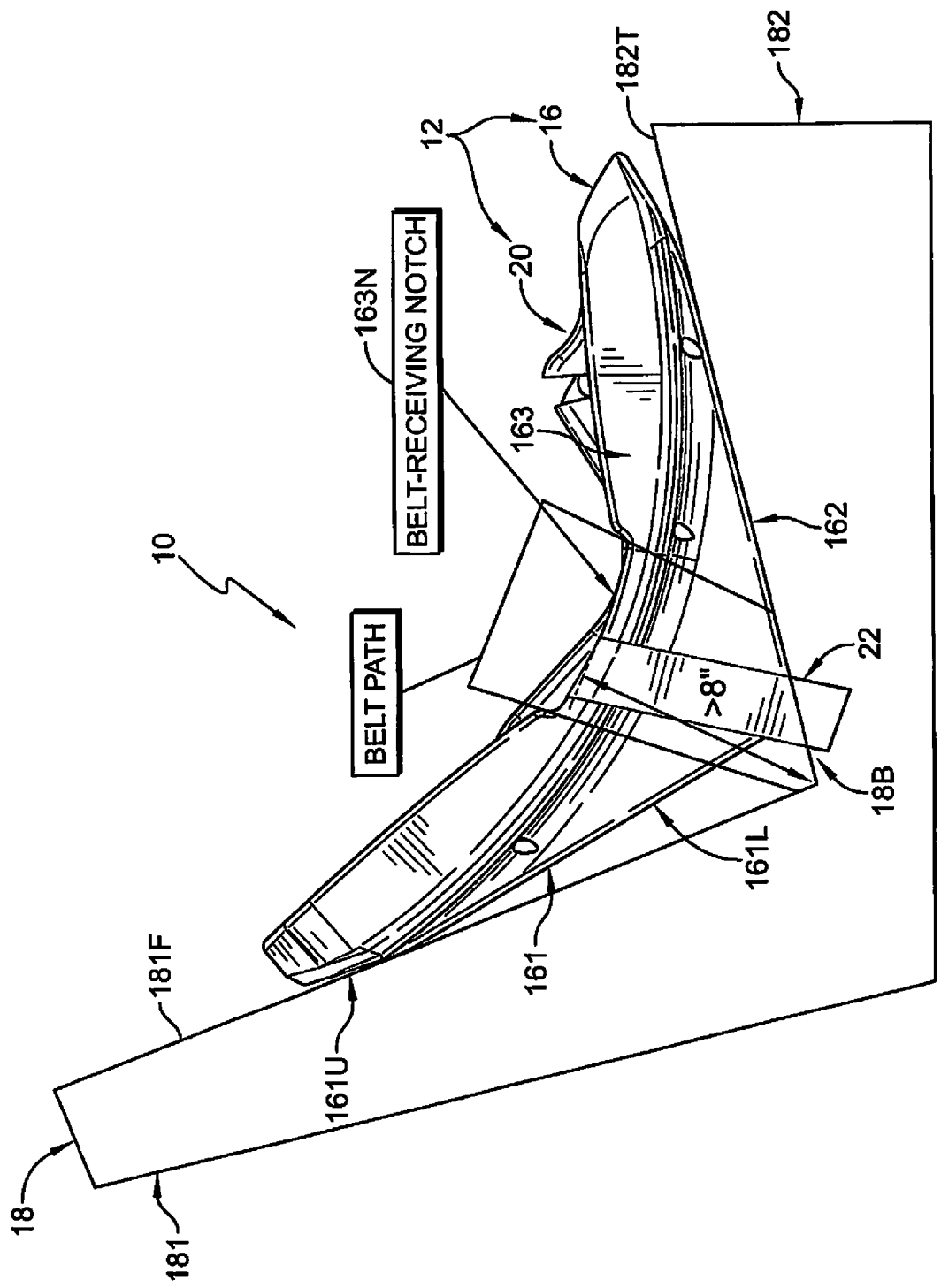
FIG. 2 is a view similar to FIG. 1 showing an available belt path associated with a wide longitudinally extending belt-receiving notch formed in a first side wall of the foundation and showing placement of a portion of the foundation-anchor belt in a rearward section of the belt-receiving notch to establish a fulcrum that is at least eight inches away from a seat bite of the vehicle passenger seat.

A width of belt-receiving notch 163N of greater than eight inches as measured between first and second upright sections 163E1, 163E2 is shown in FIG. 2. A belt path 22BP established by belt-receiving notch 163N for foundation-anchor belt 22 is generally routed over a surface that is equal distance from contact points/regions 320-380 on front surface 181F of seat back 181 and top surface 182T of seat bottom 182 as suggested in FIG. 2. Foundation-anchor belt 22 is routed along belt path 22BP roughly from seat bite 18B of vehicle passenger seat 18 such that under tension foundation 16 is tightened generally equally against front surface 181F of seat back 181 and top surface 182T of seat bottom 182. The lateral edge 163E3 on first side wall 163 and second side wall (not shown) in belt bath 22BP creates a fulcrum on opposite sides of foundation 16 that is at least eight inches away from vehicle seat bite 18B as suggested in FIG. 2 so that a vehicle seatbelt buckle 22B will never be forced over the fulcrum established by lateral edge 163E3 of belt-receiving notch 163N onto and in such a way as to limit the tightening function of foundation-anchor belt 22. An open included angle having a measure of about 107° is provided between bottom wall 162 and lower seat-back engagement pad 161L of rear wall 161 as shown, for example, in FIG. 3. The 107° open included angle was selected in accordance with the present disclosure to maximize consistent stability of seat-support base 12, despite variations in size and shape of vehicle passenger seat 18.

Figure 8:
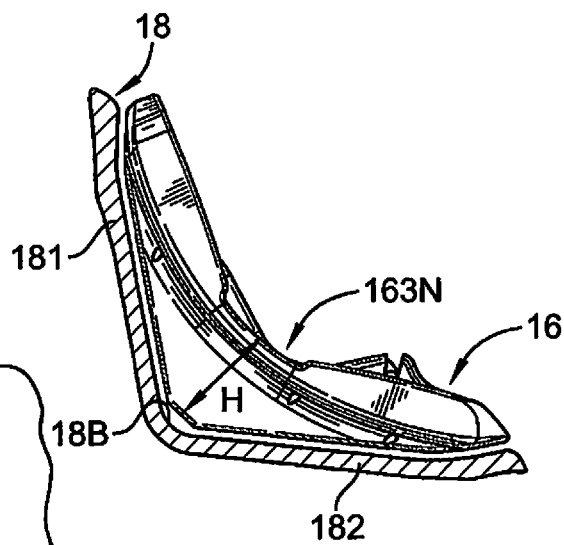
FIG. 8 is a diagrammatic reduced-size elevation view of the foundation on the vehicle passenger seat.
Figure 7:
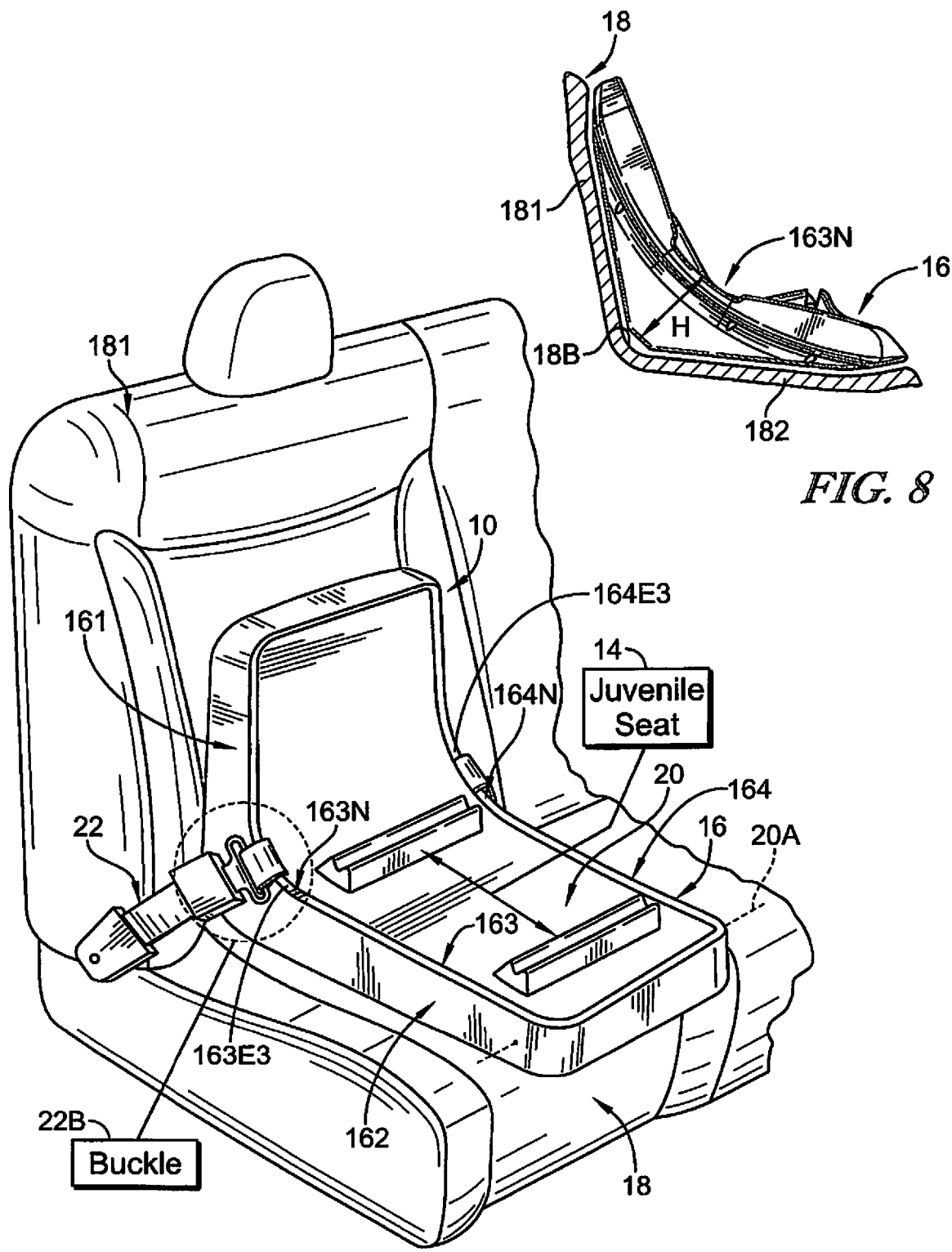
FIG. 7 is a view similar to FIG. 6 showing pivotable movement of the seat holder about a laterally extending pivot axis to engage and tension the far belt strap while a buckle unit comprising the buckle and the fitting remain outside and away from the foundation.

Installation of seat-support base 12 on vehicle passenger seat 18 is accomplished using a foundation-anchor belt 22 associated with vehicle passenger seat 18 as suggested in FIGS. 6-8. Foundation-anchor belt 22 comprises a fitting 22F coupled to a free end of a first belt strap 221 and a fitting retainer 22R coupled to a free end of a second belt strap 222. Fitting 22F and fitting retainer 22R cooperate to form a vehicle seatbelt buckle 22B.

In use, once foundation 16 of seat-support base 12 is anchored by foundation-anchor belt 22 in a stationary position on vehicle passenger seat 18, vehicle seatbelt buckle 22B is retained in a position outside of and away from foundation 16 as suggested in FIG. 7. In accordance with the present disclosure, vehicle seatbelt buckle 22B will not be pulled or forced to pass the height H (see FIG. 8) and is retained in spaced-apart relation to a fulcrum established by lateral edge 163E3. Buckle 22B will not interfere with movement of seat-holder unit 20 from the opened position shown in FIG. 6 to the closed position shown in FIG. 7 in which the seat-holder unit 20 mates with foundation 16 to tension foundation-anchor belt 22 and, as such, will not limit or otherwise degrade the tightening or tensioning of foundation-anchor belt 22 by movement of seat-holder unit 20 to the closed position.

Foundation 16 has a shape that is optimized to promote stability when foundation 16 is anchored to lie in a stationary position on vehicle passenger seat 18 as suggested in FIG. 1. Such stability is maintained in accordance with the present disclosure even when the vehicle passenger seat geometry varies as in the example of first vehicle passenger seats 18, 118 including steep-inclined seat bottoms shown in FIGS. 1 and 4 and a second vehicle passenger seat 218 including a shallow-inclined seat bottom as shown in FIG. 5.

As suggested in FIG. 4, an illustrative first vehicle passenger seat 118 includes a seat back 1181 and a steep-inclined seat bottom 1182. First vehicle passenger seat 118 is formed to include a seat bite 118B at the junction between seat back 1181 and seat bottom 1182. Seat back 1181 includes a forwardly facing front surface 181F as shown, for example, in FIG. 4. Steep-inclined seat bottom 1182 includes an upwardly facing top surface 182T as shown, for example, in FIG. 4. Seat back 1181 and steep-inclined seat bottom 1182 cooperate to form an open included angle having a measure of about 85° in which top surface 1182T of steep-inclined seat bottom 1182 is inclined at about 17.4° from the horizontal as suggested in FIG. 4.

As suggested in FIG. 5, illustrative second vehicle passenger seat 218 includes a seat back 2181 and a shallow-inclined seat bottom 2182. Second vehicle passenger seat 218 is formed to include a seat bite 218B at the junction between seat back 2181 and shallow-inclined seat bottom 2182. Seat back 2181 includes a forwardly facing front surface 2181F as shown, for example, in FIG. 5. Seat bottom 2182 includes an upwardly facing top surface 2182T as shown, for example, in FIG. 5. Seat back 2181 and shallow-inclined seat bottom 2182 cooperate to form an open included angle having a measure of about 109° in which top surface 2182T of shallow-inclined seat bottom 2182 is inclined at about 6.3° from the horizontal as suggested in FIG. 5.

Foundation 16 of seat-support base 12 has a size and shape selected in accordance with the present disclosure to create a stable interface between various vehicle passenger seats (e.g. seats 18, 118, 218) provided with steep-inclined or shallow-inclined seat bottoms and a child-restraint system including a foundation-anchor belt 22, which interface may vary in the field as a function of variances in vehicle passenger seat geometry and vehicle passenger seat belt design. A juvenile seat 14 can be mounted on seat-support base 12 in accordance with the present disclosure in either a forward-facing orientation facing away from seat back 181 or a rearward-facing orientation facing toward seat back 181. Foundation 16 is optimized in shape and size in accordance with the present disclosure to mate with a vehicle passenger seat 18 and a seat belt 22 to detachably connect to at least one (juvenile) car seat for a child to sit facing either the rear of the vehicle or the front of the vehicle.

The size and shape of foundation 16 in accordance with the present disclosure provides a consistent stable fit among a wide range of differently shaped vehicle passenger seats. Foundation 16, once installed on a vehicle passenger seat 18, has an equally tensioned fit to the vehicle in accordance with the present disclosure such that an attempt to move foundation 16 substantially in any direction relative to the companion vehicle passenger seat (e.g. seat 18, 118, 218) is substantially limited to less than one inch in illustrative embodiments. This provides a stable seat-support base 12 for a forward-facing or rearward-facing juvenile seat 14.

A child restraint 10 comprises a juvenile holder 13 including a seat-support base 12 and a juvenile seat 14 configured to the mounted on seat-support base 12 as suggested in FIG. 1. Seat-support base 12 includes a foundation 16 adapted to set on a vehicle passenger seat 18 having a seat bottom 182 and a seat back 181 extending upwardly from seat bottom 182. Seat back 181 includes an upper section 181U arranged to lie in spaced-apart relation to seat bottom 182 and a lower section 181L located between seat bottom 182 and upper section 181U as suggested in FIG. 1.

Foundation 16 includes a downwardly facing bottom wall 162 adapted to engage an upwardly facing top surface 182T of seat bottom 182 of vehicle passenger seat 18 and a rearwardly facing rear wall 161 adapted to engage a front surface 181F of seat back 181 of vehicle passenger seat 18 as suggested in FIG. 1. The rearwardly facing rear wall 161 of foundation 16 includes an upper seat-back engagement pad 161U arranged to lie in spaced-apart relation to the downwardly facing bottom wall 162 and a lower seat-back engagement pad 161L arranged to extend between upper seat-back engagement pad 161U and the downwardly facing bottom wall 162 as suggested in FIG. 1.

Lower seat-back engagement pad 161L and the downwardly facing bottom wall 162 cooperate to form an open included angle having a measure of about 107 degrees as suggested in FIG. 3. A first reference plane P1 associated and aligned with upper seat-back engagement pad 161U and a second reference plane P2 associated and aligned with lower seat-back engagement pad 161L cooperate to form an acute angle that has a measure of about 20° as suggested in FIG. 3.

Upper seat-back engagement pad 161U is shown in FIG. 4 to provide means for engaging an upper section 1181U of the forwardly facing front surface 1181F of a seat back 1181 of a first vehicle passenger seat 118 having a steep-inclined seat bottom 1182 to establish a lower separation space 1181S between the lower section 1181L and lower seat-back engagement pad 161L when the downwardly facing bottom wall 162 of foundation 16 engages the upwardly facing top surface 1182T of the steep-inclined seat bottom 1182 of the first vehicle passenger seat 118 that is inclined at about 17 degrees from the horizontal and cooperates with the forwardly facing front surface 1181F of seat back 1181 of the first vehicle passenger seat 118 to define an open included angle having a measure of about 85 degrees. As suggested in FIG. 1, when used with another vehicle passenger seat 18, upper seat-back engagement pad 161U is configured to provide means for engaging an upper section 181U of the forwardly facing front surface 181F of a seat back 181 of a first vehicle passenger seat 18 having a steep-inclined seat bottom 182 to establish a lower separation space 181S between the lower section 181L and lower seat-back engagement pad 161L when the downwardly facing bottom wall 162 of foundation 16 engages the upwardly facing top surface 182T of the steep-inclined seat bottom 182 of the first vehicle passenger seat 18 that is inclined at about 14 degrees from the horizontal and cooperates with the forwardly facing front surface 181F of seat back 181 to define an open included angle having a measure of about 98°. It is within the scope of the present disclosure to use foundation 16 on other vehicle passenger seats having differently inclined steep-inclined seat bottoms.

Lower seat-back engagement pad 161L is configured to provide means for engaging a lower section 2181L of a forwardly facing front surface 2181F of a seat back 2181 of a second vehicle passenger seat 218 having a shallow-inclined seat bottom 2182 to establish an upper separation space 2181S between an upper section 2181U of the forwardly facing front surface 2181F of seat back 2181 and the upper seat-back engagement pad 161U when the downwardly facing bottom wall 162 of foundation 16 engages an upwardly facing top surface 2182T of the shallow-inclined seat bottom 2182 of the second vehicle passenger seat 218 that is inclined at about six degrees from the horizontal and cooperates with the forwardly facing front surface 2181F of seat back 2181 of second vehicle passenger seat 218 to define an open included angle having a measure of about 109 degrees as suggested in FIG. 5. It is within the scope of the present disclosure to use foundation 16 on other vehicle passenger seats having differently inclined shallow-inclined seat bottoms.

Foundation 16 further includes a first side wall 163 extending along one side of foundation 16 from bottom wall 162 toward rear wall 161 and a second side wall 164 extending along an opposite side of foundation 16 from bottom wall 162 toward rear wall 16 as suggested in FIGS. 1 and 6. Second side wall 164 is arranged to lie in laterally spaced-apart relation to first side wall 163 to locate seat-holder unit 20 therebetween as suggested in FIGS. 1, 6, and 7. Juvenile seat 14 is coupled to seat-holder unit 20 of seat-support base 12 to extend upwardly above first and second side walls 163, 164 of foundation 16.

Each of the first and second side walls 163, 164 of foundation 16 is formed as suggested in FIGS. 6 and 7 to include belt-receiving notch means 163N or 164N for receiving a foundation-anchor belt 22 coupled to the vehicle passenger seat 18 to retain foundation 16 in an installed position on vehicle passenger seat 18 and for positioning foundation-anchor belt 22 to engage a first lateral edge 163E on first side wall 163 and a second lateral edge 164E on second side wall 164 to create a fulcrum on the first and second side walls 163, 164 of foundation 16 that is located at least eight inches away from a seat bite 18B formed in the vehicle passenger seat 18 on which foundation 16 rests at a junction between seat back 181 and bottom 182 of that vehicle passenger seat 18 so that a vehicle seatbelt buckle 22B included in foundation-anchor belt 22 will not be forced over the fulcrum established by the first and second lateral edges 163E, 164E in such a way as to limit a tightening function of the foundation-anchor belt 22. Seat-holder unit 20 is mounted on foundation 16 for pivotable movement about a seat-holder pivot axis 20A between an opened position extending away from rear wall 161 of foundation 16 to expose an interior space 20S located between the first and second side walls 163, 164 as suggested in FIG. 6 and a closed position extending toward rear wall 161 of foundation 16 to trap a portion of foundation-anchor belt 22 between foundation 16 and seat-holder unit 20 to locate vehicle seatbelt buckle 22B in laterally spaced-apart relation to second side wall 164 of foundation 16 to locate first side wall 162 of foundation 16 therebetween as suggested in FIG. 7.

The invention claimed is:

1. A child restraint comprising
a juvenile holder including a seat-support base and a separate juvenile seat configured to be mounted on the seat-support base, the seat-support base including a foundation adapted to set on a vehicle passenger seat having a seat bottom and a seat back extending upwardly from the seat bottom and including an upper section arranged to lie in spaced-apart relation to the seat bottom and a lower section located between the seat bottom and the upper section, the foundation including a downwardly facing bottom wall adapted to engage an upwardly facing top surface of a seat bottom of the vehicle passenger seat and a rearwardly facing rear wall adapted to engage a front surface of a seat back of the vehicle passenger seat, the rearwardly facing rear wall including an upper seat-back engagement pad arranged to lie in spaced-apart relation to the downwardly facing bottom wall and a lower seat-back engagement pad arranged to extend between the upper seat-back engagement pad and the downwardly facing bottom wall, and wherein the lower seat-back engagement pad and the downwardly facing bottom wall cooperate to form an open included angle having a measure of about 107 degrees,
a first reference plane associated and aligned with the upper seat-back engagement pad and a second reference plane associated and aligned with the lower seat-back engagement pad cooperate to form an acute angle that has a measure of about 20°,
the upper seat-back engagement pad is configured to engage an upper section of the forwardly facing front surface of a seat back of a first vehicle passenger seat having a steep-inclined seat bottom to establish a lower separation space between the lower section and the lower seat-back engagement pad when the downwardly facing bottom wall of the foundation engages the upwardly facing top surface of the steep-inclined seat bottom of the first vehicle passenger seat that is inclined at about 17 degrees from the horizontal and cooperates with the forwardly facing front surface of the seat back of the first vehicle passenger seat to define an open included angle having a measure of about 85 degrees, and
the lower seat-back engagement pad is configured to engage a lower section of a forwardly facing front surface of a seat back of a second vehicle passenger seat having a shallow-inclined seat bottom to establish an upper separation space between an upper section of the forwardly facing front surface of the seat back and the upper seat-back engagement pad when the downwardly facing bottom wall of the foundation engages an upwardly facing top surface of the shallow-inclined seat bottom of the second vehicle passenger seat that is inclined at about six degrees from the horizontal and cooperates with the forwardly facing front surface of the seat back of the second vehicle passenger seat to define an open included angle having a measure of about 109 degrees.

2. A child restraint comprising
a juvenile holder including a seat-support base and a separate juvenile seat configured to be mounted on the seat-support base, the seat-support base including a foundation adapted to set on a vehicle passenger seat having a seat bottom and a seat back extending upwardly from the seat bottom and including an upper section arranged to lie in spaced-apart relation to the seat bottom and a lower section located between the seat bottom and the upper section, the foundation including a downwardly facing bottom wall adapted to engage an upwardly facing top surface of a seat bottom of the vehicle passenger seat and a rearwardly facing rear wall adapted to engage a front surface of a seat back of the vehicle passenger seat, the rearwardly facing rear wall including an upper seat-back engagement pad arranged to lie in spaced-apart relation to the downwardly facing bottom wall and a lower seat-back engagement pad arranged to extend between the upper seat-back engagement pad and the downwardly facing bottom wall, and wherein the lower seat-back engagement pad and the downwardly facing bottom wall cooperate to form an open included angle having a measure of about 107 degrees,
a first reference plane associated and aligned with the upper seat-back engagement pad and a second reference plane associated and aligned with the lower seat-back engagement pad cooperate to form an acute angle that has a measure of about 20°,
the upper seat-back engagement pad is configured to engage an upper section of the forwardly facing front surface of a seat back of a first vehicle passenger seat having a steep-inclined seat bottom to establish a lower separation space between the lower section and the lower seat-back engagement pad when the downwardly facing bottom wall of the foundation engages the upwardly facing top surface of the steep-inclined seat bottom of the first vehicle passenger seat that is inclined at about 17 degrees from the horizontal and cooperates with the forwardly facing front surface of the seat back of the first vehicle passenger seat to define an open included angle having a measure of about 85 degrees, and
the lower seat-back engagement pad is configured to engage a lower section of a forwardly facing front surface of a seat back of a second vehicle passenger seat having a shallow-inclined seat bottom to establish an upper separation space between an upper section of the forwardly facing front surface of the seat back and the upper seat-back engagement pad when the downwardly facing bottom wall of the foundation engages an upwardly facing top surface of the shallow-inclined seat bottom of the second vehicle passenger seat that is inclined at about six degrees from the horizontal and cooperates with the forwardly facing front surface of the seat back of the second vehicle passenger seat to define an open included angle having a measure of about 109 degrees,
wherein the seat-support base further includes a seat-holder unit, the foundation further includes a first side wall extending along one side of the foundation from the bottom wall toward the rear wall and a second side wall extending along an opposite side of the foundation from the bottom wall toward the rear wall and lying in laterally spaced-apart relation to the first side wall to locate the seat-holder unit therebetween, the juvenile seat is coupled to the seat-holder unit to extend upwardly above the first and second side walls of the foundation, and each of the first and second side walls of the foundation is formed to include belt-receiving notch means for receiving a foundation-anchor belt coupled to the vehicle passenger seat to retain the foundation in an installed position on the vehicle passenger seat and positioning the foundation-anchor belt to engage a first lateral edge on the first side wall and a second lateral edge on the second side wall to create a fulcrum on the first and second side walls of the foundation that is located at least eight inches away from a seat bite formed the vehicle passenger seat on which the foundation rests at a junction between the seat back and bottom of that vehicle passenger seat so that a vehicle seatbelt buckle included in the foundation-anchor belt will not be forced over the fulcrum established by the first and second lateral edges in such a way as to limit a tightening function of the foundation-anchor belt.

3. The child restraint of claim 2, wherein the first side wall is formed to include an upwardly facing edge that is U-shaped and includes short and spaced-apart first and second upright sections and a longer lateral section extending between and interconnecting lowermost ends of the first and second upright sections to establish the first lateral edge engaged to the foundation-anchor belt.

4. The child restraint of claim 3, wherein the first upright section has a negative slope as compared to the longer lateral section and the second upright section has a positive slope as compared to the longer lateral section.

5. The child restraint of claim 3, wherein the longer lateral section has a length of about eight inches as measured between the first and second upright sections.

6. The child restraint of claim 2, wherein the seat-holder unit is mounted on the foundation for pivotable movement about a seat-holder pivot axis from an opened position extending away from the rear wall of the foundation to expose an interior space located between the first and second side walls and a closed position extending toward the rear wall of the foundation to trap a portion of the foundation-anchor belt between the foundation and the seat-holder unit to locate the vehicle seatbelt buckle in laterally spaced-apart relation to the second side wall of the foundation to locate the first side wall of the foundation therebetween.

7. The child restraint of claim 1, wherein the lower separation space has a volume that is greater than a volume of the upper separating space.

8. The child restraint of claim 1, further comprising the first vehicle passenger seat having the steep-inclined seat bottom and a seat back, and wherein the seat back extends upwardly from the steep-inclined seat bottom and the first vehicle passenger seat is formed to include a seat bite at a junction between the seat back of the first vehicle passenger seat and the steep-inclined seat bottom of the first vehicle passenger seat, the steep-inclined seat bottom includes an upwardly facing top surface, the seat back of the first vehicle passenger seat includes a forwardly facing front surface that cooperates with the upwardly facing top surface of the steep-inclined seat bottom to define an open included angle having a measure of about 85 degrees, and contact points for the upper seat-back engagement pad of the rear wall of the foundation on the forwardly facing front surface of the seat back of the first vehicle passenger seat range from about 320 millimeters to 380 millimeters from the seat bite upwardly along the forwardly facing front surface of the seat back of the first vehicle passenger seat.

9. The child restraint of claim 1, wherein the upper seat-back engagement pad is fixed in position relative to the downwardly facing bottom wall.

10. A child restraint comprising
a juvenile holder including a seat-support base and a separate juvenile seat configured to be mounted on the seat-support base, the seat-support base including a foundation adapted to set on a vehicle passenger seat having a seat bottom and a seat back, the foundation including a downwardly facing bottom wall adapted to engage an upwardly facing top surface of a seat bottom of the vehicle passenger seat and a rearwardly facing rear wall adapted to engage a front surface of a seat back of the vehicle passenger seat, the rearwardly facing rear wall including an upper seat-back engagement pad arranged to lie in spaced-apart relation to the downwardly facing bottom wall and a lower seat-back engagement pad arranged to extend between the upper seat-back engagement pad and the downwardly facing bottom wall,
a first reference plane associated and aligned with the upper seat-back engagement pad and a second reference plane associated and aligned with the lower seat-back engagement pad cooperate to form an acute angle that has a measure of about 20°,
wherein the seat-support base further includes a seat-holder unit, the foundation further includes a first side wall extending along one side of the foundation from the bottom wall toward the rear wall and a second side wall extending along an opposite side of the foundation from the bottom wall toward the rear wall and lying in laterally spaced-apart relation to the first side wall to locate the seat-holder unit therebetween, the juvenile seat is coupled to the seat-holder unit to extend upwardly above the first and second side walls of the foundation, and each of the first and second side walls of the foundation is formed to include belt-receiving notch configured to receive a foundation-anchor belt coupled to the vehicle passenger seat to retain the foundation in an installed position on the vehicle passenger seat and positioning the foundation-anchor belt to engage a first lateral edge on the first side wall and a second lateral edge on the second side wall to create a fulcrum on the first and second side walls of the foundation so that a vehicle seatbelt buckle included in the foundation-anchor belt will not be forced over the fulcrum established by the first and second lateral edges in such a way as to limit a tightening function of the foundation-anchor belt.

11. The child restraint of claim 10, wherein the seat-holder unit is mounted on the foundation for pivotable movement about a seat-holder pivot axis from an opened position and a closed position.

* * * * *